USOO9839329B2

United States Patent
Chu (10) Patent No.: US 9,839,329 B2
(45) Date of Patent: Dec. 12, 2017

(54) FRYING PAN HOLDER (71) Applicant: NA SEUNG HITECH CO., LTD., Gyeonggi-do (KR)

(72) Inventor: Jonathan Chu, Gyeonggi-do (KR)

(73) Assignee: NA SEUNG HITECH CO., LTD., Bucheon-si, Gyeonggi-Do (KR)

( * ) Notice: Subject to any disclaimer, the term of this patent is extended or adjusted under 35 U.S.C. 154(b) by 0 days.

(21) Appl. No.: 15/217,412

(22) Filed: Jul. 22, 2016

(65) Prior Publication Data
US 2017/0224176 A1 Aug. 10, 2017

(30) Foreign Application Priority Data
Feb. 4, 2016 (KR) .................. 10-2016-0014054

(51) Int. Cl.
| A47J 47/16 | (2006.01) |
| A47B 57/54 | (2006.01) |
| A47B 57/36 | (2006.01) |
| A47F 5/13 | (2006.01) |

(52) U.S. Cl.
CPC .............. *A47J 47/16* (2013.01); *A47B 57/36* (2013.01); *A47B 57/545* (2013.01); *A47F 5/13* (2013.01)

(58) Field of Classification Search
CPC .......... A47J 47/16; A47B 55/02; A47B 81/04; A47B 73/002; A47B 57/36; A47B 57/545; A47F 5/01; A47F 5/13; A47F 7/0042; A47F 7/0064; A47F 7/0007
USPC .... 211/181.1, 41.11, 106, 119, 85.31, 90.03, 211/150, 41.2, 126.9, 187, 188, 36, 153, 211/190, 206, 33, 90.02, 41.3, 41.4; 248/175, 302; 108/163; 294/143
See application file for complete search history.

(56) References Cited

U.S. PATENT DOCUMENTS

| 459,281 A * | 9/1891 | Godwin ................. A47G 25/10 211/31 |
| 789,125 A * | 5/1905 | Emerson ................. B42F 17/02 211/181.1 |
| 1,065,000 A * | 6/1913 | Behm ..................... A47J 47/16 211/41.11 |
| 1,159,485 A * | 11/1915 | Foster .................... A47G 29/18 211/74 |
| 2,307,752 A * | 1/1943 | Anderson ................ A47K 5/05 248/302 |
| 2,518,549 A * | 8/1950 | Hyde ................. A01K 39/0106 119/464 |
| 2,972,414 A * | 2/1961 | Sipe ....................... A47J 47/16 211/41.11 |

(Continued)

*Primary Examiner* — Stanton L Krycinski
*Assistant Examiner* — Hiwot Tefera
(74) *Attorney, Agent, or Firm* — Saliwanchik, Lloyd & Eisenschenk (57) ABSTRACT Disclosed is a frying pan holder including a frame structure including a pair of vertical frames that are spaced apart from each other and are vertically formed, and one or more horizontal frames that connect the pair of vertical frames, and a plurality of holding members, each of which includes a pair of outer holding parts, each of which has a protrusion coupled to a corresponding one of the pair of vertical frames at one end thereof and has an opposite end that is horizontally curved, and an inner holding part formed between the pair of outer holding parts, wherein the plurality of holding members are formed on one side or opposite sides of the frame structure.

3 Claims, 7 Drawing Sheets

(56) References Cited

U.S. PATENT DOCUMENTS

| | | | | | |
|---|---|---|---|---|---|
| 3,429,541 | A | * | 2/1969 | Herman | A61H 3/02 135/68 |
| 3,900,109 | A | * | 8/1975 | Peterson | A47F 5/01 211/153 |
| 4,023,682 | A | * | 5/1977 | Niece | A47B 57/581 108/27 |
| 4,391,378 | A | * | 7/1983 | Secon | A47F 5/13 108/109 |
| 4,583,646 | A | * | 4/1986 | Bowman | A47F 5/08 211/181.1 |
| 4,666,201 | A | * | 5/1987 | Chap | A47J 47/16 108/64 |
| D364,074 | S | * | 11/1995 | Yeh | D6/678.4 |
| 6,386,379 | B1 | * | 5/2002 | Battaglia | A47B 96/00 211/106 |
| 6,564,950 | B1 | * | 5/2003 | Holm | A47B 55/02 211/106 |
| 6,997,329 | B2 | * | 2/2006 | Ohanian | A47J 47/16 211/181.1 |
| 2004/0251222 | A1 | * | 12/2004 | Ohanian | A47J 47/16 211/41.11 |
| 2008/0251472 | A1 | * | 10/2008 | Kasden | A47J 36/06 211/41.2 |
| 2014/0217869 | A1 | * | 8/2014 | Eng | A47L 15/505 312/228.1 |
| 2015/0129518 | A1 | * | 5/2015 | Ho | A47J 47/16 211/41.2 |

* cited by examiner

FRYING PAN HOLDER

CROSS-REFERENCE TO RELATED APPLICATION

This application claims the benefit under 35 U.S.C. §119 of Korean Patent Application No. 10-2016-0014054 filed Feb. 4, 2016, which is hereby incorporated by reference in its entirety.

BACKGROUND

Embodiments of the inventive concept relate to a frying pan holder, and more particularly to a frying pan holder that receives a plurality of frying pans in a limited space.

In general, frying pans are used in homes or kitchens when foods are cooked, and have various sizes or forms depending on the purposes of cooking and have various forms of handles. In particular, frying pans equipped with handles are generally preserved in the interior of a sink due to the structures of the handles or preserved on walls by using separate rings.

However, when the frying pans are preserved in the interiors of a sink due to the length structures of the handles, they occupy a big space so that a plurality of frying pans cannot be received, and it is difficult to receive various kitchen utensils as well as frying pans in a limited space such as a sink of a kitchen at the same time.

Korean Utility Model No. 20-0385652 relates to a frying pan holder, and discloses a technology of arranging frying pans according to the sizes thereof.

BRIEF SUMMARY

Embodiments of the inventive concept relate to a frying pan holder, and provide a technology on a frying pan holder that horizontally receives a plurality of frying pans in a limited space.

Embodiments of the inventive concept provide a frying pan holder that ensures an excellent spatial utility by receiving a plurality of frying pans in a limited space while a plurality of holding members in which frying pans may be horizontally held are coupled to at least one side of a frame structure that are vertically formed.

Embodiments of the inventive concept provides a frying pan holder that holds kitchen utensils of various sizes by selectively using a plurality of holding members that may be detachably mounted on a vertically formed frame structure due to resiliency.

Embodiments of the inventive concept provide a frying pan holder in which an inner holding part of a holding member is formed inside outer holding parts of the holding member while having steps to prevent falling of a frying pan and allow the frying pan to be held in an inverse direction, thereby allowing the frying pan to be easily dried after being washed.

In accordance with an aspect of the inventive concept, there is provided a frying fan holder including a frame structure including a pair of vertical frames that are spaced apart from each other and are vertically formed, and one or more horizontal frames that connect the pair of vertical frames, and a plurality of holding members, each of which includes a pair of outer holding parts, each of which has a protrusion coupled to a corresponding one of the pair of vertical frames at one end thereof and has an opposite end that is horizontally curved, and an inner holding part formed between the pair of outer holding parts, wherein the plurality of holding members are formed on one side or opposite sides of the frame structure.

Each of the pair of vertical frames may include a pair of vertical columns that are spaced apart from each other by an interval such that a plurality of coupling holes are formed by a plurality of auxiliary frames that are horizontally formed to be perpendicular to the pair of vertical columns, each of the protrusions of the holding members may have a stapler shape that protrudes outwards such that the protrusion is inserted into a corresponding coupling hole that is formed in a corresponding one of the pair of vertical frames from the inside to protrude outwards, and the holding members may be resilient such that the protrusions are coupled to or separated from the coupling holes.

In each of the holding members, the opposite ends of the pair of outer holding parts are curved to form at least a portion of a U shape, the opposite ends of the pair of outer holding parts may be curved inwards to the inner holding part such that steps are formed by bending parts between the opposite ends of the pair of outer holding parts and the inner holding part, and the inner holding part may be situated below the pair of holding parts while forming the steps together with the pair of outer holding parts, and are curved to form at least a portion of the U shape.

Each of the plurality of holding members may be integrally formed by bending and curving a metal pipe having a diameter, the pair of outer holding parts may act as a support or a guide when a frying pan is horizontally held, and the inner holding part may act as a support when the frying pan is horizontally held in a normal direction and acts as a stop when the frying pan is horizontally held in a reverse direction.

At least one of the horizontal frames may contact the bottom to assist an upright posture of the pair of vertical frames, and one of the plurality of holding members, which is coupled to a lowest side of the frame structure, may further include a support formed at lower portions of the outer holding parts to contact the bottom.

The coupling holes may be a plurality of pairs of coupling holes, each of the pair of coupling holes being formed on upper and lower sides, the plurality of pairs of coupling holes may be formed on opposite sides of the pair of vertical frames to be spaced apart from each other by a height, and the plurality of holding members may be selectively coupled to the pair of pairs of coupling holes such that a plurality of coupling holes are arranged on opposite sides of the frame structure and are selectively detachably mounted on the frame structure depending on the size of a kitchen utensil that is held in the frying pan holder.

Each of the plurality of holding members may be configured such that the inner holding part is formed by forming steps at lower portion of the opposite ends of the pair of outer holding parts by the bending parts and is inclined from the bending parts upwards, and the size of a holding member of the plurality of holding members coupled to the frame structure, which is arranged on the relatively upper side, may be smaller than the size of a holding member of the plurality of holding members, which is arranged on the relatively lower side.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept will be described with reference to the accompanying drawings. However, the embodiments may be modified into other various forms, and the scope of the inventive concept is not limited by the embodiments. Further, the embodiments are provided to describe the inventive concept to those skilled in the art more completely. In the drawings, the shapes and sizes of the elements may be exaggerated for clearer description.

The embodiments may provide a frying fan holder in which a plurality of holding members, on which frying fans may be horizontally held at least one side of a vertical frame structure, are coupled to the frame structure so that a plurality of frying pans are received even in a limited space, ensuring an excellent spatial utility.

Further, the frying pan holder according to various embodiments may hold kitchen utensils of various sizes by selectively using a plurality of holding members that may be detachably mounted to the vertical frame structure with resiliency.

Further, in the frying pan holder according to various embodiments, an inner holding part forming steps with outer holding parts is formed between the outer holding parts of the holding member to prevent fall of a frying pan, and the frying pan may be easily washed and dried by holding the frying pan in a reverse direction.

The frying pan according to an embodiment may include a frame structure including a pair of vertical frames that are spaced apart from each other and are vertically formed, and one or more horizontal frames that connect the pair of vertical frames; and a plurality of holding members, each of which includes a pair of outer holding parts, each of which has a protrusion coupled to a corresponding one of the pair of vertical frames at one end thereof and has an opposite end that is horizontally curved, and an inner holding part formed between the pair of outer holding parts. Here, the plurality of holding members are formed on one side or opposite sides of the frame structure.

Hereinafter, a frying pan holder according to an embodiment will be described in more detail with an example.

Figure 1:
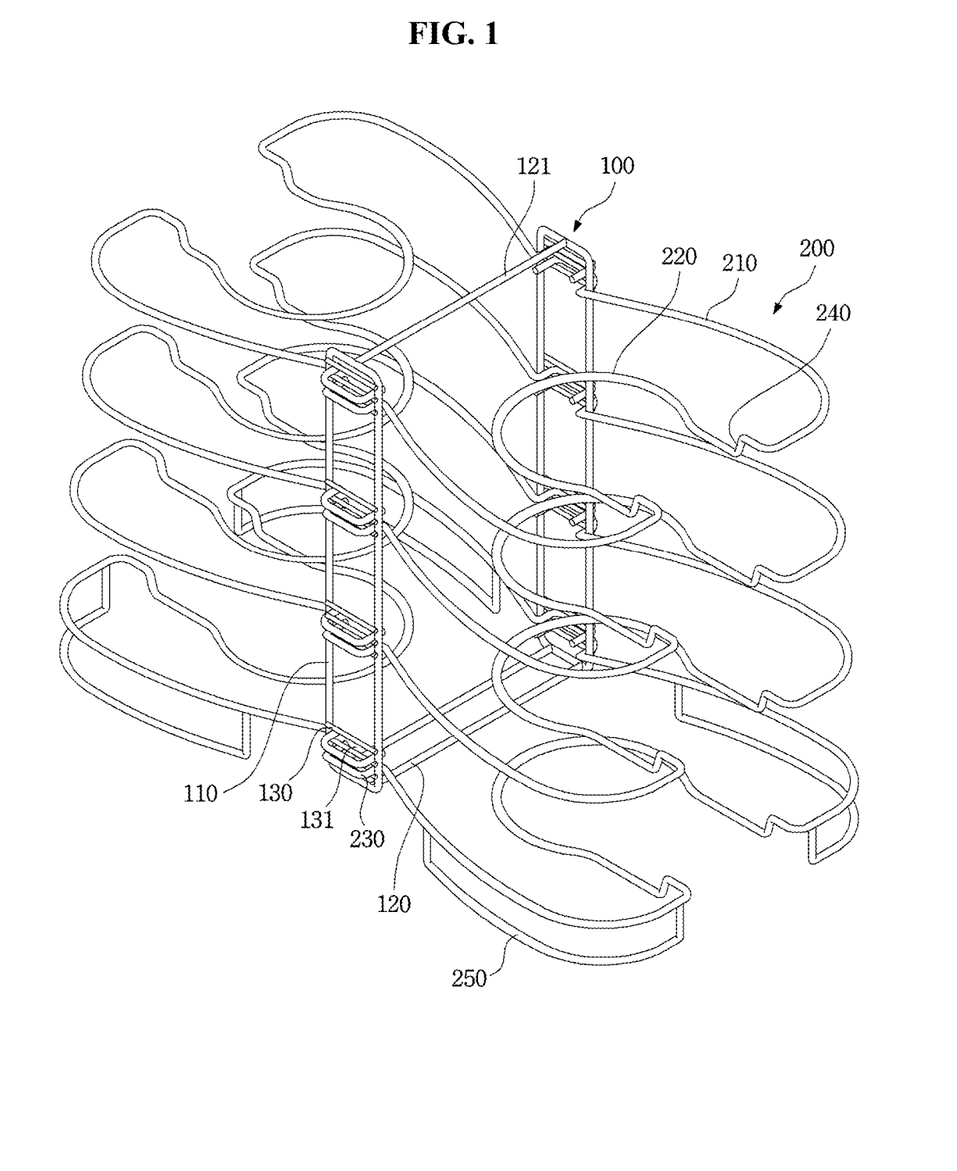
FIG. 1 is a perspective view of a frying pan holder according to an embodiment.

FIG. 1 is a perspective view illustrating a frying pan holder according to an embodiment.

Referring to FIG. 1, the frying pan holder according to an embodiment may include a frame structure 100 and a holding member 200, and a plurality of holding members 200 may be coupled to the frame structure 100.

In the frying pan holder according to an embodiment, the frame structure 100 may be installed on the bottom in an upright posture to be selectively coupled to the plurality of holding members 200 so that a plurality of kitchen utensils such as frying pans may be horizontally held. Although reception of a plurality of frying pans that have low containing parts and long handles or frying pans that cannot be easily arranged will be described in the following, kitchen utensils having various sizes and shapes may be received by providing a frying pan holder by which the heights and sizes of the holding members may be selectively adjusted.

The frame structure 100 may include a pair of vertical frames 110 and one or more horizontal frame 120. The pair of vertical frames 110 may be vertically formed to be spaced apart from each other by a specific interval, and the one or more horizontal frames 120 may connect the pair of vertical frames 110.

Each of the pair of vertical frames may include a pair of vertical columns that are spaced apart from each other, and a plurality of auxiliary frames 130 may be horizontally formed between the pair of vertical columns to be perpendicular to the pair of vertical columns. For example, the plurality of auxiliary frames 130 may be attached to the pair of vertical columns through a method such as welding.

Then, a plurality of coupling holes 131 may be formed by the plurality of auxiliary frames 130 horizontally formed between the pair of vertical columns to be perpendicular to the pair of vertical columns.

A plurality of pairs of upper and lower coupling holes 131 may be formed in both of the pair of vertical frames 110 at a specific height interval. Accordingly, the plurality of holding members 200 may be selectively coupled to the plurality of pairs of upper and lower coupling holes 131 such that a plurality of coupling holes 131 are arranged on opposite sides of the frame structure 100. Then, the user may arrange a plurality of holding members 200 on one side with respect to the frame structure 100, according to an installation space or a purpose.

For example, a plurality of members 200 may be coupled to the coupling holes 131 formed on the relatively upper side on one side of the vertical frames 110, and a plurality of holding members 200 may be coupled to the coupling holes 131 formed on the relatively lower side on an opposite side of the vertical frames 110.

One or more horizontal frames 120 may be spaced apart from each other at a specific interval to connect the pair of vertically formed vertical frames 110.

The horizontal frames 120 connect the pair of vertical frames 110, and the shape and number of the horizontal frames 120 are not limited but the horizontal frames 120 may be formed on the upper and lower sides of the frying pan holder to maintain a whole balance of the frame structure 100.

Further, at least one of the horizontal frames 120 may contact the bottom to assist an upright posture of the pair of vertical frames 110. That is, the horizontal frame 120 formed on the lower side may contact the bottom so that the frying pan is balanced without being inclined or fallen down even if a plurality of kitchen utensils are held in the frying pan holder or a plurality of kitchen utensils are held only on one side.

The holding members 200 are adapted to hold kitchen utensils such as frying pans or pots horizontally, and each of the holding members 200 may include a pair of outer holding parts 210 and an inner holding part 220.

Each of the pair of outer holding parts 210 may have a protrusion 230 that is coupled to a corresponding one of the pair of vertical frames 110 at one end thereof. In more detail, each of the pair of outer holding parts 210 may be horizontally curved and a portion thereof is opened such that one side end is formed and a protrusion 230 that is coupled to a corresponding one of the pair of vertical frames 110 may be formed at the opened end.

For example, each of the pair of outer holding parts 210 are curved to form at least a portion of a U shape, and as another example, each of the pair of outer holding parts 210 may be curved to form at least a portion of a ring shape.

The outer holding parts 210 may act as supports 250 or guides when the frying pans are horizontally held.

For example, if the frying pans are horizontally held in the holding members 200 when the sizes of the held frying pans are larger than the sizes of the outer holding parts 210, the frying pans may be guided to be prevented from deviating from a specific range even when the frying pan holder is shaken or the frying pans are shaken.

As another example, if the frying pans are horizontally held in the holding members 200 when the sizes of the held frying pans are larger than the sizes of the outer holding parts 210, the outer holding parts 210 may acts as supports alone or together with the inner holding parts 220 according to the sizes and shapes of the bottoms of the frying pans.

Here, various kitchen utensils such as pots or containers, as well as frying pans may be held in the holding members 200.

Each of the pair of protrusions 230 of the holding member 200 may have a stapler shape that protrudes outwards, and may be inserted into a coupling hole 131 of a corresponding one of the pair of vertical frames 110 to protrude outwards.

In more detail, the protrusion 230 formed at one end of an outer holding part 210 of the holding member 200 may have a stapler shape that protrudes outwards and the protrusion 230 formed at one end of the other outer holding part 210 of the holding member 200 may have an inverse stapler shape that protrudes outwards so that the pair of protrusions 230 may be inserted into the corresponding coupling holes 131 formed in the pair of vertical frames 110 from the inside and protrude outwards.

Further, the holding member 200 has resiliency so that the pair of protrusions 230 may be coupled to and firmly fixed to the corresponding coupling holes 131 and may be easily coupled and separated by the user.

That is, as the user presses the outer holding parts 210 of the holding member 200 inwards from opposite sides, the pair of protrusions 230 formed at opposite ends of the holding member 200 may be moved to the inside by a distance due to resiliency to be inserted into and coupled to the coupling holes 131, and may be restored to the original shape by the resiliency so as to be firmly fixed to the coupling holes 131 without being easily separated.

Similarly, as the user presses the outer holding parts 210 of the holding member 200 inwards from opposite sides, the pair of protrusions 230 formed at opposite ends of the holding member 200 are moved inwards by a distance due to the resiliency to be easily separated from the coupling holes 131.

Then, a material having a resilient force or more may be used to manufacture the holding member 200, the protrusions 230 formed at the opposite ends of the holding member 200 may be moved inwards even though a material having a low resilient force is used, by opening portions of the outer holding parts 210 of the holding member 200. For example, the holding member 200 may be formed of a metallic material.

The heights of the spaces in which kitchen utensils may be adjusted by selectively using the plurality of holding members 200 that may be detachably mounted on the vertically formed frame structure 100 due to resiliency so that kitchen utensils of various sizes may be received.

The holding part 220 is formed between the outer holding parts 210, and may be horizontally curved. In more detail, the inner holding part 220 is horizontally curved, and opposite sides of the inner holding part 220 may be connected to the outer holding parts 210.

For example, the inner holding part 220 may be curved to form at least a portion of the U shape, and as another example, the inner holding part 220 may be curved to form at least a portion of the ring shape.

The inner holding part 220 may act as a support 250 when a frying pan is horizontally held in a normal direction, and may acts as a stopper when a frying pan is horizontally held in an inverse direction.

For example, if the held frying pan is held in the holding member 200 in a normal direction, the inner holding part 220 may act as a support 250 alone when the size of the frying pan is smaller than the size of the outer holding parts 210 and may act as a support of the frying pan together with the outer holding parts 210 when the size of the frying pan is larger than the size of the holding parts 210. Then, the inner holding part 220 has a large step on the lower side of the outer holding parts 210, and when the bottom of the frying pan is horizontal, only the outer holding parts 210 may act as supports.

For another example, when the held frying pan is horizontally held in an inverse direction, the inner holding part 220 may act as a stop by which the inside of the container part of the frying pan is stopped when the size of the frying pan is smaller than the sizes of the outer holding parts 210. Then, because the handle of the frying pan is arranged on an opened side of the U-shaped inner holding part 220, the frying pan may be held without being stopped by the outer holding parts 210 and the inner holding part 220 even when the handle of the frying pan is inclined downwards.

Meanwhile, the holding member 200 may include bending parts 240 that connect the outer holding parts 210 and the inner holding part 220, in addition to the outer holding parts 210 and the inner holding part 220.

The bending parts 240 may be configured such that front ends of the outer holding parts 210 are bent inwards to be connected to the inner holding part 220 while forming steps.

The bending parts 240 may be formed in the holding member 200 such that front ends of the outer holding parts 210 that are curved to form at least a portion of the U shape are bent inwards to be connected to the inner holding part 220 while forming steps so that the inner holding part 220 may be formed below the outer holding parts 210 while forming the steps with the outer holding parts 210. Then, the inner holding part 220 may be curved to form at least a portion of the U shape.

Further, the inner holding part 220 may be formed by forming the steps below the outer holding parts 210 from the front ends of the outer holding parts 210 with the bending parts 240, and the inner holding part 220 may be formed to be inclined upwards from the bending parts 240. Accordingly, a frying pan may be prevented from being fallen even when being held in an inverse direction.

Meanwhile, the holding member 200 may be formed by bending and curving a metal pipe having a specific diameter. Then, the holding member 200 may be integrally formed.

The plurality of holding members 200 coupled to the frame structure 100 may have one or more sizes so that the user may selectively use the plurality of holding members 200 according to the size of an installation site and the size of a held kitchen utensil.

For example, the size of the holding member 200 of the plurality of holding members 200, which is coupled to a relatively upper side of the frame structure 100, may be smaller than the holding member 200, which is arranged on a relatively lower side of the frame structure 100.

As another example, the sizes of the plurality of holding members 200, which are coupled to the frame structure 100, may become sequentially larger as they go from the upper side to the lower side.

Furthermore, the holding member 200 of the plurality of holding members 200, which is coupled to lower side of the frame structure 100, may further include a support 250.

The support 250 may be formed at a lower portion of the outer holding part 210 to contact the bottom so that the frying pan holder may be balanced. That is, even when the frying pan holder cannot be balanced only by the frame structure 100, the support 250 is formed at a lower portion of the holding member 200 so that the balance of the frying pan holder may be assisted. Accordingly, the frying pan holder can prevent falling of a kitchen utensil held in the frying pan holder even when the kitchen utensil is received because the frying pan holder is hardly shaken.

The plurality of holding members 200 may be formed on at least one side of the frame structure 100. For example, the plurality of holding members 200 may be formed only on one side of the frame structure 100, and as another example, the plurality of holding members 200 may be formed on each of opposite sides of the frame structure 100.

Figure 2:
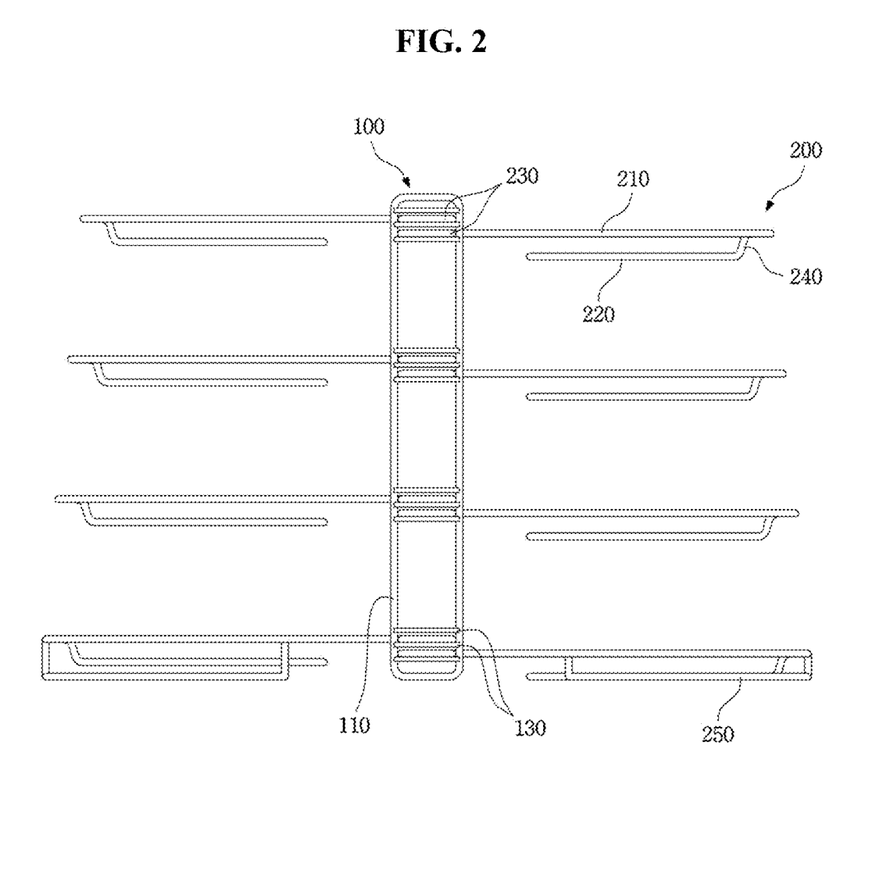
FIG. 2 is a front view of a frying pan holder according to an embodiment.

FIG. 2 is a front view of a frying pan holder according to an embodiment.

Referring to FIG. 2, the frying pan holder according to an embodiment may include a frame structure 100 and a holding member 200, and a plurality of holding members 200 may be coupled to at least one side of the frame structure 100.

The frame structure 100 may include a pair of vertical frames 110 that are vertically formed to be spaced apart from each other by a specific interval, and one or more horizontal frames 120 that connect the pair of vertical frames 110.

Each of the pair of vertical frames may include a pair of vertical columns that are spaced apart from each other, and a plurality of auxiliary frames 130 may be horizontally formed between the pair of vertical columns to be perpendicular to the pair of vertical columns. Accordingly, a plurality of coupling holes 131 may be formed by the plurality of auxiliary frames 130 that are formed perpendicular to the pair of vertical columns.

A plurality of pairs of upper and lower coupling holes 131 may be formed in both of the pair of vertical frames 110 at a specific height interval. One of the plurality of protrusions 230 formed in the holding member 200 may be coupled to the coupling hole 131.

Accordingly, the plurality of holding members 200 may be selectively coupled to the plurality of pairs of upper and lower coupling holes 131 such that a plurality of coupling holes 131 are arranged on opposite sides of the frame structure 100.

The bending parts 240 may be formed in the holding member 200 such that front ends of the outer holding parts 210 that are curved to form at least a portion of the U shape are bent inwards to be connected to the inner holding part 220 while forming steps so that the inner holding part 220 may be formed below the outer holding parts 210 while forming the steps with the outer holding parts 210. Then, the inner holding part 220 may be curved to form at least a portion of the U shape.

Because the holding member 200 includes an inner holding part 220 that forms steps with the outer holding parts 210, the inner holding parts 220 formed on the lower side may act as a support 250 and the outer holding parts 210 formed on the upper side may act as a guide while preventing a kitchen utensil from being fallen when the kitchen utensil is held.

Additionally, the holding member 200 of the plurality of holding members 200, which is coupled to lower side of the frame structure 100, may further include a support 250.

The support 250 may be formed at a lower portion of the outer holding part 210 to contact the bottom so that the frying pan holder may be balanced. That is, even when the frying pan holder cannot be balanced only by the frame structure 100, the support 250 is formed at a lower portion of the holding member 200 so that the balance of the frying pan holder may be assisted. Accordingly, the frying pan holder can prevent falling of a kitchen utensil held in the frying pan holder even when the kitchen utensil is received because the frying pan holder is hardly shaken.

Figure 3:
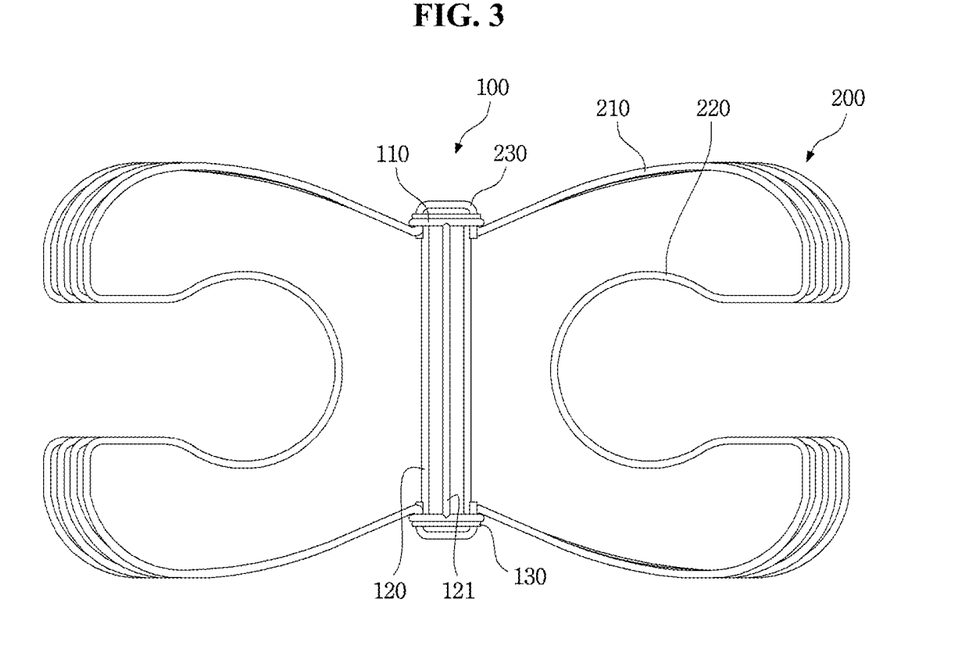
FIG. 3 is a plan view of a frying pan holder according to an embodiment.

FIG. 3 is a plan view of a frying pan holder according to an embodiment.

Referring to FIG. 3, in the frying pan holder according to an embodiment, a holding member 200 may be integrally formed by bending and curving a metal pipe having a specific diameter.

The plurality of holding members 200 coupled to the frame structure 100 may have one or more sizes so that the user may selectively use the plurality of holding members 200 according to the size of an installation site and the size of a held kitchen utensil.

For example, the size of the holding member 200 of the plurality of holding members 200, which is coupled to a relatively upper side of the frame structure 100, may be smaller than the holding member 200, which is arranged on a relatively lower side of the frame structure 100.

As another example, the sizes of the plurality of holding members 200, which are coupled to the frame structure 100, may become sequentially larger as they go from the upper side to the lower side.

Accordingly, the user may selectively attach a plurality of holding members 200 to the frame structure 100 in consideration of the size of an installation site in which the frying pan is arranged and the size of a kitchen utensil. Accordingly, kitchen utensils of various sizes can be received and falling of the received kitchen utensil can be prevented.

Figure 4:
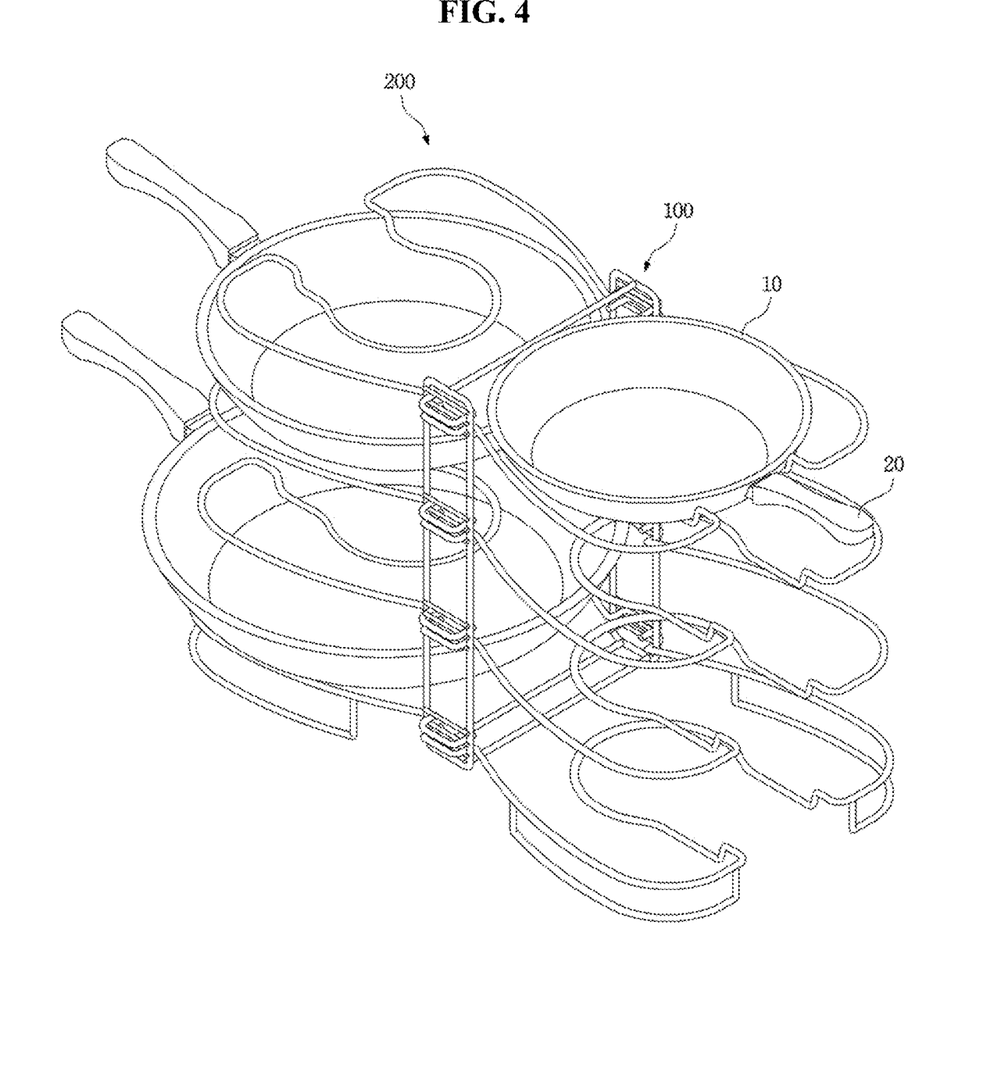
FIG. 4 is a view of a usage of a frying pan holder according to an embodiment.
Figure 5:
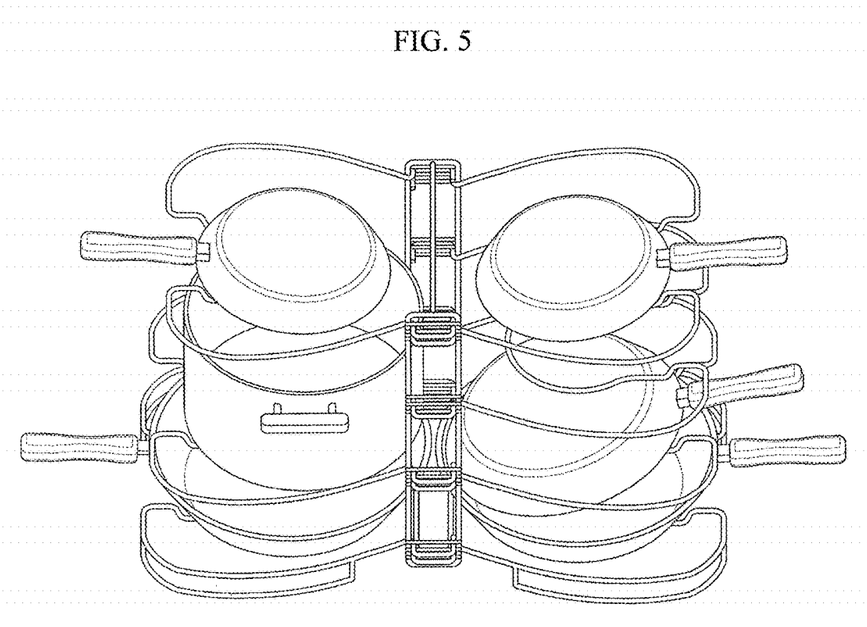
FIG. 5 is a view of an actual usage of a frying pan holder according to an embodiment.

FIG. 4 is a view illustrating a usage of a frying pan holder according to an embodiment. FIG. 5 is a view illustrating an actual usage of a frying pan holder according to an embodiment.

Referring to FIGS. 4 and 5, the frying pan holder according to an embodiment can receive kitchen utensils such as a plurality of frying pans 10 by forming a plurality of holding members 200 on one or more sides of the frame structure 100 as illustrated in FIGS. 1 to 3. In particular, because a plurality of holding members 200 are formed on each of opposite sides of the frame structure 100, a plurality of kitchen utensils may be horizontally held.

In particularly, because the protrusions 230 formed in the holding member 200 may be easily coupled to or separated from the coupling hole 131 of the frame structure 100, the user may selectively the holding members according to the sizes of the held kitchen utensils so that the holding heights of the kitchen utensils may be adjusted.

Further, the bending parts 240 may be formed in the holding member 200 such that front ends of the outer holding parts 210 are bent inwards to be connected to the inner holding part 220 while forming steps so that the inner holding part 220 may be formed below the outer holding parts 210 while forming the steps with the outer holding parts 210.

Because the holding member 200 includes an inner holding part 220 that forms steps with the outer holding parts 210, the inner holding parts 220 formed on the lower side may act as a support 250 and the outer holding parts 210 formed on the upper side may act as a guide while preventing a kitchen utensil from being fallen when the kitchen utensil is held.

In particular, when the frying pan 10 is held in an inverse direction, the container part of the frying pan is held in the U-shaped inner holding part 220 and the handle 11 of the frying pan is arranged on an opened side of the inner holding part 220 so that the frying pan 10 may be guided by the stepped outer holding parts 210, while being prevented from being fallen. Then, the container part of the frying pan is stopped by the bending parts 240 and the steps may guide the outer holding parts 210 formed on the upper side such that the outer holding parts 210 may not be separated outwards.

Similarly, the container part of the frying pan is stopped by the bending parts 240 and the steps may guide the outer holding parts 210 formed on the upper side such that the outer holding parts 210 may not be separated outwards even when the frying pan 110 is held in a normal direction.

In this way, the embodiments may provide a frying fan holder in which a plurality of holding members 200, on which frying fans may be horizontally held at least one side of a vertical frame structure 100, are coupled to the frame structure 100 so that a plurality of frying pans are received even in a limited space, ensuring an excellent spatial utility.

For example, the frying pan holder according to an embodiment may have four holding members 200 on each of the opposite sides thereof so that a total of eight frying pans 10 may be received. This allows frying pans to be maximally received in a minimum space and may solve an inconvenience of use when the kitchen utensils overlap each other when being held.

Further, in the frying pan holder according to various embodiments, an inner holding part 220 forming steps with outer holding parts 210 is formed between the outer holding parts 210 of the holding member 200 to prevent fall of a frying pan, and the frying pan may be easily washed and dried by holding the frying pan in an inverse direction.

Figure 6:
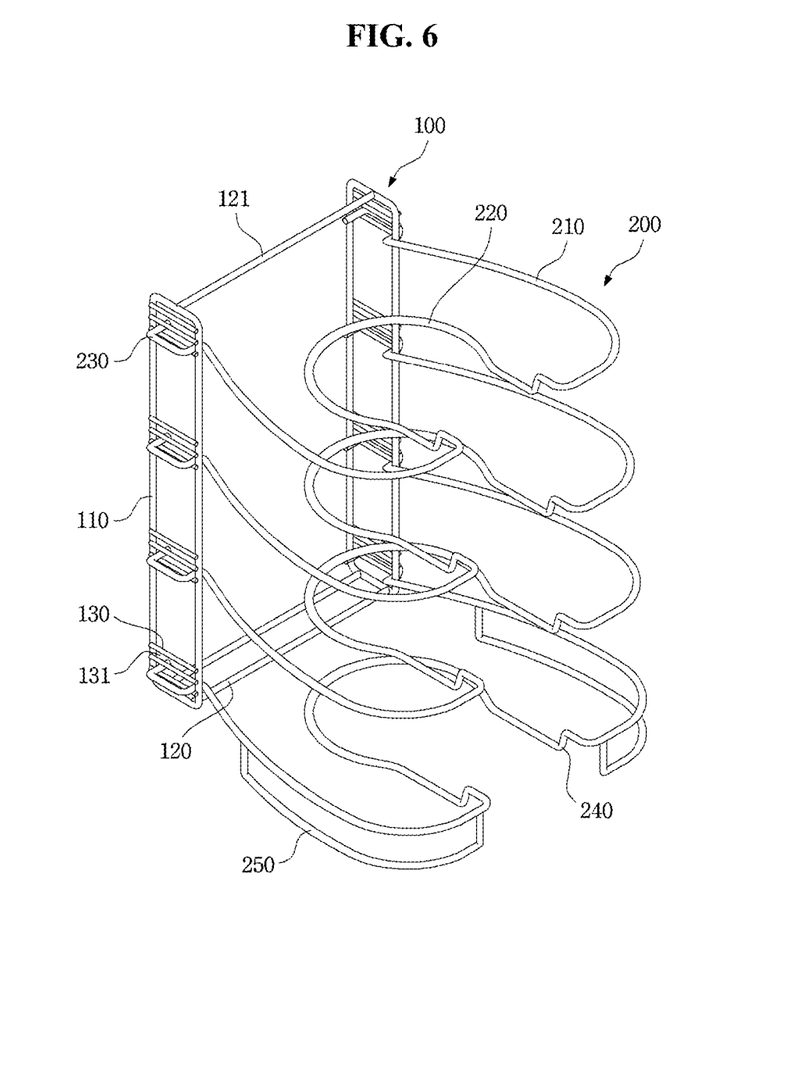
FIG. 6 is a perspective view of a frying pan holder according to another embodiment.
Figure 7:
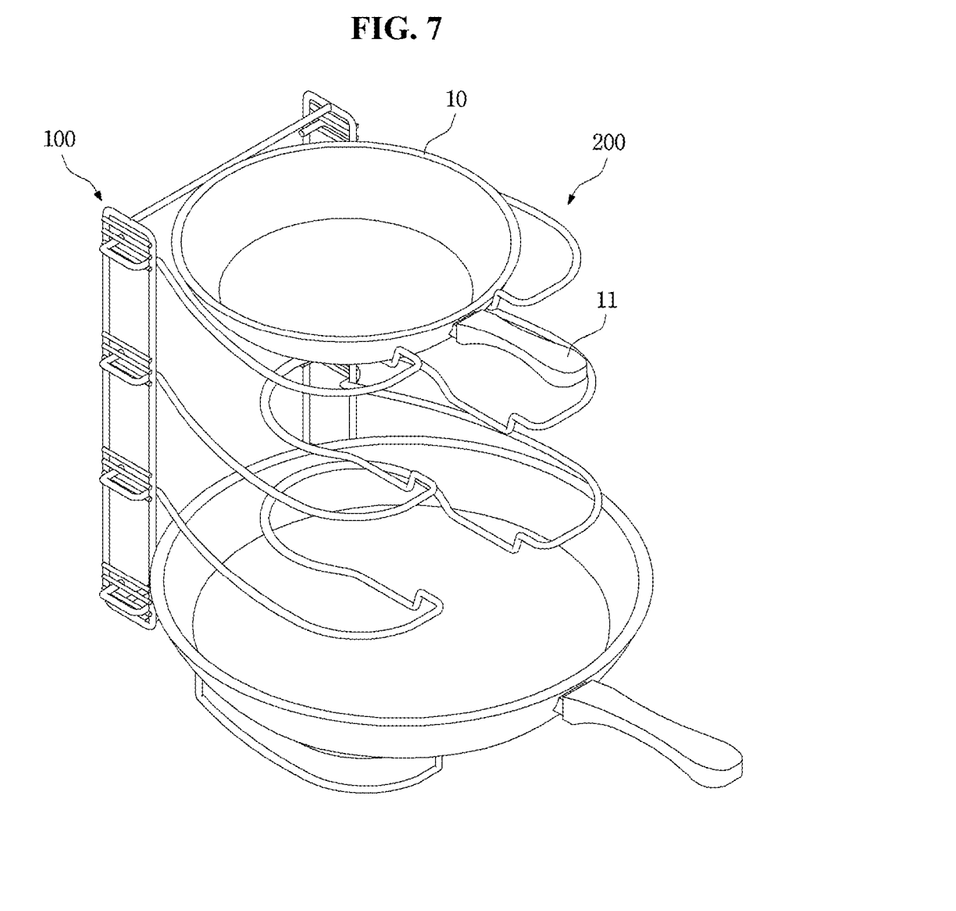
FIG. 7 is a view of a usage of a frying pan holder according to another embodiment.

FIG. 6 is a perspective view of a frying pan holder according to another embodiment. FIG. 7 is a view illustrating an actual usage of a frying pan holder according to another embodiment.

Referring to FIGS. 6 and 7, the frying pan holder according to the embodiment may include a plurality of holding members 200 on one side of the frame structure 100. This structure is the same as that of the frying pan holders of FIGS. 1 to 5, and will be briefly described.

Referring to FIG. 1, the frying pan holder according to an embodiment may include a frame structure 100 and a holding member 200, and a plurality of holding members 200 that are horizontally coupled may be coupled to one side of the frame structure 100.

In the frying pan holder according to the embodiment, the frame structure 100 may be installed on the bottom in an upright posture to be selectively coupled to the plurality of holding members 200 so that a plurality of kitchen utensils such as frying pans 10 may be horizontally held.

The frame structure 100 may include a pair of vertical frames 110 and one or more horizontal frame 120. The pair of vertical frames 110 may be vertically formed to be spaced apart from each other by a specific interval, and the one or more horizontal frames 120 may connect the pair of vertical frames 110.

Each of the pair of vertical frames may include a pair of vertical columns that are spaced apart from each other, and a plurality of auxiliary frames 130 may be horizontally formed between the pair of vertical columns to be perpendicular to the pair of vertical columns. Then, a plurality of coupling holes 131 may be formed by the plurality of auxiliary frames 130 that are formed perpendicular to the pair of vertical columns.

One or more horizontal frames 120 may be spaced apart from each other at a specific interval to connect the pair of vertically formed vertical frames 110. Further, at least one of the horizontal frames 120 may contact the bottom to assist an upright posture of the pair of vertical frames 110.

The holding members 200 are adapted to hold kitchen utensils such as frying pans 10 or pots horizontally, and each of the holding members 200 may include a pair of outer holding parts 210 and an inner holding part 220.

The outer holding parts 210 may be horizontally curved and a plurality of protrusions 230 that are coupled to the pair of the vertical frames 110 may be formed at opposite ends of the outer holding parts 210. In more detail, each of the pair of outer holding parts 210 may be horizontally curved and a portion thereof is opened such that one side end is formed and a protrusion 230 that is coupled to a corresponding one of the pair of vertical frames 110 may be formed at the opened end.

Because one of the opposite ends of the outer holding parts 210 of the holding member 200 has a stapler shape that protrudes outwards and the other of the opposite ends of the outer holding parts 210 has an inverse stapler shape that protrudes outwards, the plurality of protrusions 230 of the holding members 200 may be inserted into the coupling holes 131 formed in the pair of vertical frames 110 to protrude outwards.

Further, the holding member 200 has resiliency so that the pair of protrusions 230 may be coupled to and firmly fixed to the corresponding coupling holes 131 and may be easily coupled and separated by the user.

The holding part 220 is formed between the outer holding parts 210, and may be horizontally curved. In more detail, the inner holding part 220 is horizontally curved, and opposite sides of the inner holding part 220 may be connected to the outer holding parts 210.

Meanwhile, the holding member 200 may include bending parts 240 that connect the outer holding parts 210 and the inner holding part 220, in addition to the outer holding parts 210 and the inner holding part 220.

The bending parts 240 may be configured such that front ends of the outer holding parts 210 are bent inwards to be connected to the inner holding part 220 while forming steps.

That is, the bending parts 240 may be formed in the holding member 200 such that front ends of the outer holding parts 210 that are curved to form at least a portion of the U shape are bent inwards to be connected to the inner holding part 220 while forming steps so that the inner holding part 220 may be formed below the outer holding parts 210 while forming the steps with the outer holding parts 210. Then, the inner holding part 220 may be curved to form at least a portion of the U shape.

Meanwhile, the holding member 200 may be formed by bending and curving a metal pipe having a specific diameter. Then, the holding member 200 may be integrally formed.

The plurality of holding members 200 coupled to the frame structure 100 may have one or more sizes so that the user may selectively use the plurality of holding members 200 according to the size of an installation site and the size of a held kitchen utensil.

Furthermore, the holding member 200 of the plurality of holding members 200, which is coupled to lower side of the frame structure 100, may further include a support 250.

In this way, according to various embodiments, because a plurality of holding members 200 by which a frying pan 10 may be horizontally held are coupled to one side of the frame structure 100 that is vertically formed, a maximum number of kitchen utensils may be received in a minimum space, ensuring an excellent spatial utility.

Embodiments of the inventive concept provide a frying pan holder that ensures an excellent spatial utility by receiving a plurality of frying pans in a limited space while a plurality of holding members in which frying pans may be horizontally held are coupled to at least one side of a frame structure that are vertically formed.

Embodiments of the inventive concept provides a frying pan holder that holds kitchen utensils of various sizes by selectively using a plurality of holding members that may be detachably mounted on a vertically formed frame structure due to resiliency.

Embodiments of the inventive concept provide a frying pan holder in which an inner holding part of a holding member is formed inside outer holding parts of the holding member while having steps to prevent falling of a frying pan and allow the frying pan to be held in an inverse direction, thereby allowing the frying pan to be easily dried after being washed.

What is claimed is:

1. A frying pan holder comprising:
   a frame structure comprising a pair of vertical frames that are spaced apart from each other and are vertically formed, and one or more horizontal frames that connect the pair of vertical frames, wherein each vertical frame comprises:
   a pair of vertical columns that are spaced apart from each other by an interval;
   a plurality of pairs of coupling holes, each pair of coupling holes vertically spaced part from another, between the pair of vertical columns, where each coupling hole is formed by a plurality of auxiliary frames that are horizontally formed to be perpendicular to the pair of vertical columns; and
   a plurality of resilient holding members, each of which comprises a pair of outer holding parts, each outer holding part having one end and an opposite end, where the one end of each outer holding part is curved to form a stapler-shaped protrusion, such that each of the protrusions is inserted into a coupling hole in one of the pair of vertical frames and the opposite end is horizontally curved inwards towards an inner holding part, whereby an inclined bending part between the inner holding part and the opposite end of the outer holding part forms a step, such that the inner holding part is situated between and below the pair of outer holding parts;
   wherein each of the holding members of the plurality of holding members, when coupled to the frame structure, is smaller than the holding member therebelow; and
   wherein the plurality of holding members are formed on one side or opposite sides of the frame structure.

2. The frying pan holder of claim 1, wherein each of the plurality of holding members is integrally formed by bending and curving a metal pipe having a diameter, and wherein the pair of outer holding parts is adapted to support or guide a flying pan when held horizontally, and the inner holding part is adapted to support the frying pan when the frying pan is held horizontally, with a bottom side down, and is further adapted to be a stop when the frying pan is held with the bottom side up.

3. The frying pan holder of claim 1, wherein at least one of the horizontal frames assists in maintaining the balance and an upright posture of the pair of vertical frames, and wherein one of the plurality of holding members further comprises a support formed on the outer holding parts, where the support also assists in maintaining the balance and upright posture of the frying pan holder.

* * * * *